United States Patent
Chaboud et al.

(10) Patent No.: US 9,158,135 B1
(45) Date of Patent: Oct. 13, 2015

(54) HINGED ANCILLARY DISPLAYS

(71) Applicant: Amazon Technologies, Inc., Reno, NV (US)

(72) Inventors: Matthew Liang Chaboud, San Francisco, CA (US); Jesper Mikael Johansson, Redmond, WA (US); Samuel Robert Cavenagh, Seattle, WA (US); Lambert Mathias, Arlington, VA (US); Aaron Nicholas Olson, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 81 days.

(21) Appl. No.: 14/037,042

(22) Filed: Sep. 25, 2013

(51) Int. Cl.
  *G02F 1/1333* (2006.01)
  *G02F 1/01* (2006.01)
  *G02B 26/00* (2006.01)
  *G02B 26/02* (2006.01)

(52) U.S. Cl.
  CPC ............ *G02F 1/0102* (2013.01); *G02B 26/001* (2013.01); *G02B 26/004* (2013.01); *G02B 26/005* (2013.01); *G02B 26/026* (2013.01); *G02F 1/133308* (2013.01)

(58) Field of Classification Search
  CPC . H04M 1/0022; H04M 1/0252; G06F 1/1647; G06F 1/1643
  USPC ................. 349/58, 60; 345/1.1, 1.3; 343/906; 361/679.04
  See application file for complete search history.

(56) References Cited

U.S. PATENT DOCUMENTS

| | | | |
|---|---|---|---|
| 6,865,075 B2* | 3/2005 | Oakley | 361/679.1 |
| 8,081,964 B1* | 12/2011 | Enzmann et al. | 455/420 |
| 2006/0082518 A1* | 4/2006 | Ram | 345/1.1 |
| 2008/0247128 A1* | 10/2008 | Khoo | 361/681 |
| 2009/0316091 A1* | 12/2009 | Nose | 349/115 |
| 2010/0321275 A1* | 12/2010 | Hinckley et al. | 345/1.3 |
| 2011/0175748 A1* | 7/2011 | Small et al. | 340/815.55 |
| 2011/0216064 A1* | 9/2011 | Dahl et al. | 345/428 |
| 2012/0038570 A1* | 2/2012 | Delaporte | 345/173 |
| 2012/0081267 A1* | 4/2012 | Sirpal et al. | 345/1.1 |
| 2013/0009852 A1* | 1/2013 | Moscovitch | 345/1.1 |
| 2013/0169545 A1* | 7/2013 | Eaton et al. | 345/173 |
| 2013/0217443 A1* | 8/2013 | Lim et al. | 455/566 |
| 2013/0222208 A1* | 8/2013 | Gorilovsky et al. | 345/1.1 |
| 2013/0314621 A1* | 11/2013 | Montbach et al. | 349/12 |
| 2014/0198441 A1* | 7/2014 | Sharma et al. | 361/679.09 |

* cited by examiner

*Primary Examiner* — Sang V Nguyen
(74) *Attorney, Agent, or Firm* — Lee & Hayes, PLLC

(57) ABSTRACT

Ancillary or secondary displays usable with various electronic devices are described herein. In some implementations, the ancillary display may include a dual hinge to allow the ancillary display to act as a cover for a portion of an associated electronic device. In some implementations, the ancillary display may include a magnetic connector capable of providing a mechanical coupling with an electronic device. The magnetic connector may also provide a pathway for the transmission of data and/or power between the ancillary display and the electronic device.

20 Claims, 12 Drawing Sheets

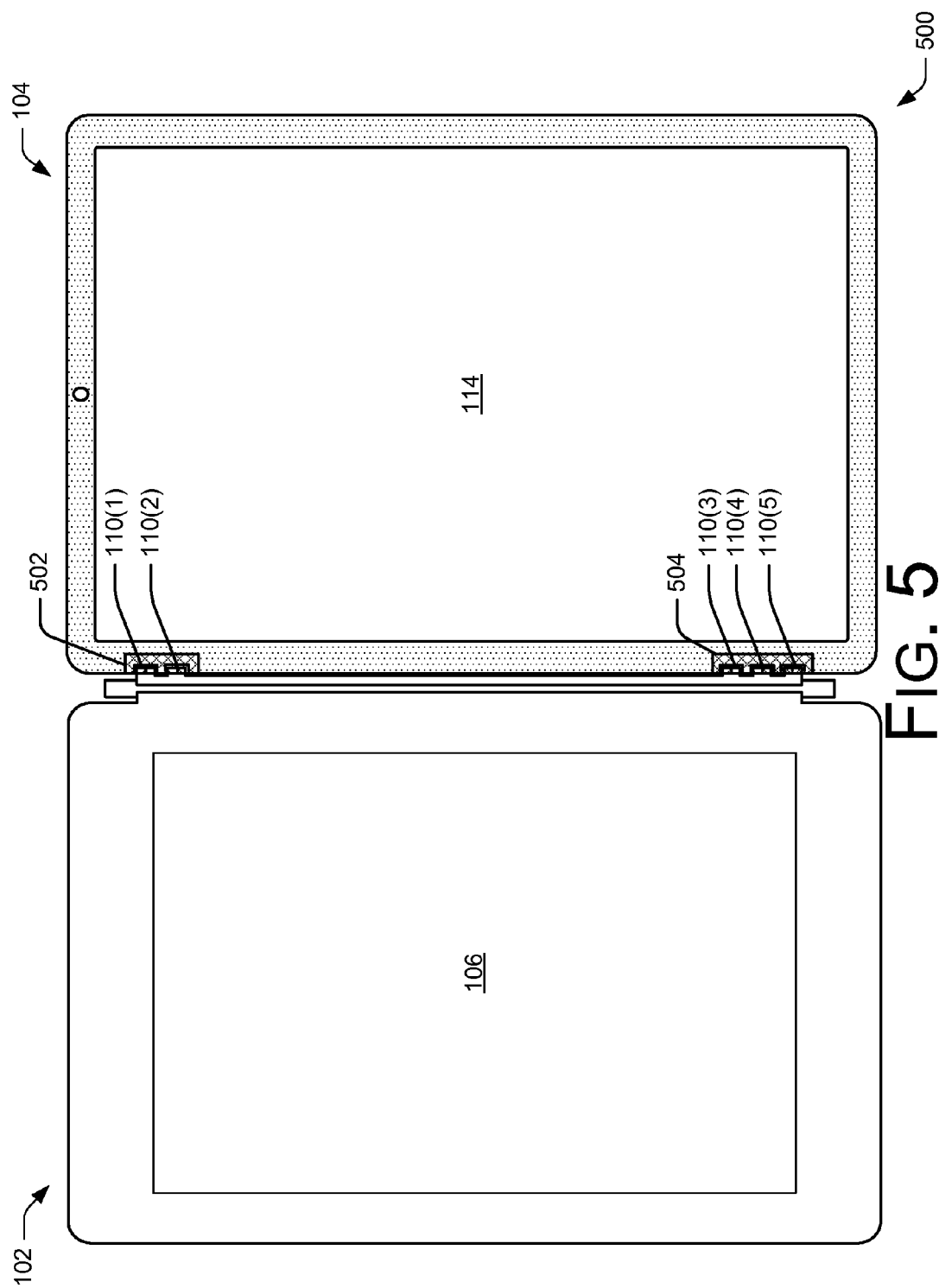

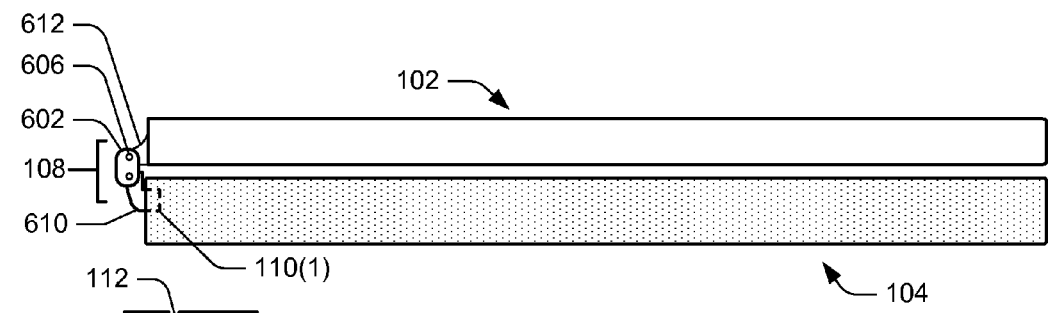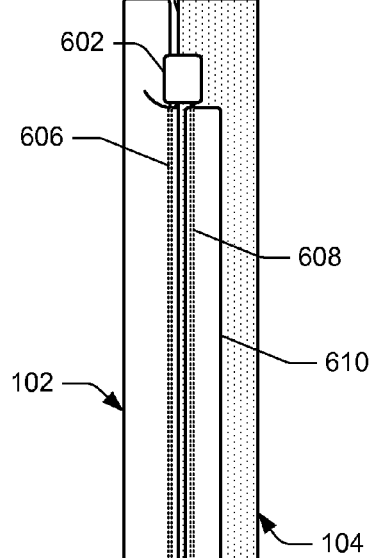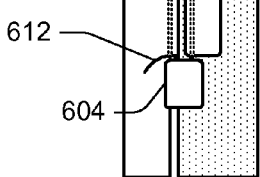
FIG. 6A
FIG. 6B

HINGED ANCILLARY DISPLAYS

BACKGROUND

Various electronic devices are utilized for the consumption of content, such as music, movies, images, electronic books, and so on. In many cases, a user may employ multiple electronic devices to consume such content. Purchasing and transporting the multiple electronic devices can be quite burdensome. For example, the high cost associated with purchasing the multiple electronic devices and/or the excessive storage space required for a user to transport the multiple electronic devices. As such, there remains a need for auxiliary equipment such a display which can act as a cover or supplement the functionality of an associated electronic device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates a front view of an example ancillary display coupled to an example electronic device.

FIGS. 6A and 6B illustrate a top view and a hinge view, respectively, of an example electronic device coupled to an ancillary display in a closed position.

DETAILED DESCRIPTION

Figure 1:
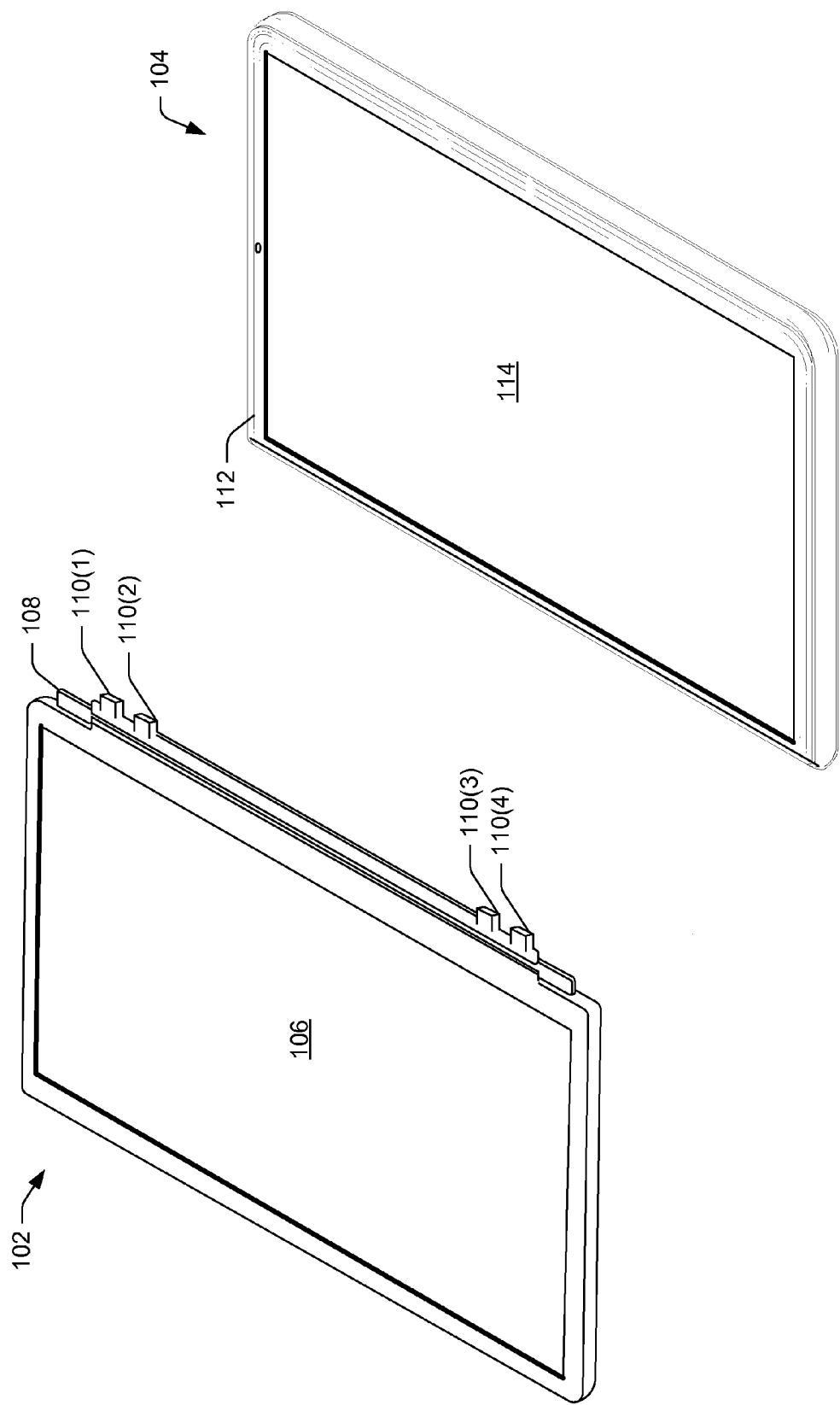
FIG. 1 illustrates a perspective view of an example ancillary display and electronic device.

This disclosure describes various ancillary displays that may be used with an electronic device, such as an electronic book ("eBook") reader device, a cellular telephone, a personal digital assistant (PDA), a portable media player, a tablet computer, or any other type of electronic device. In one implementation, the ancillary display may include a hinge or dual hinge which may allow the ancillary display to act as a cover for the electronic device. The ancillary display may have one or more displays to supplement information or graphical content shown on the electronic device. In some embodiments, the ancillary display may be a display type different from the electronic device display. For example, the electronic device may include an emissive display, such as an LCD (liquid crystal display) display, while the ancillary display may include a reflective display, such as an electronic paper display. Emissive displays are displays that convert electrical energy into light, while reflective display use ambient light to enable a display image to be seen without the use of a backlight.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Thus, the last screen image rendered on the display can be maintained and visible for very long periods of time, such as days or weeks. In addition, this technology can produce very high contrast ratios, similar to that of printed paper.

In one implementation, the electronic paper display comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the electronic paper display comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller may utilize different arrays of both light and dark particles.

Of course, while two different examples of an electronic paper display have been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. In addition, while some of the displays described below are discussed as rendering black, white, and varying shades of gray, it is to be appreciated that the described techniques apply equally to electronic paper displays capable of rendering color pixels. As such, the terms "white", "gray", and "black" may refer to varying degrees of color in implementations utilizing color displays. For instance, where a pixel includes a red color filter, a "gray"

value of the pixel may correspond to a shade of pink while a "black" value of the pixel may correspond to a darkest red of the color filter.

In some implementations, the ancillary display may be a same display type as the display of the electronic device. For example, the displays of the ancillary display and the electronic device may both be reflective displays.

In some implementations, the ancillary display when coupled to the electronic device may provide functionality previously unsupported by the electronic device. For example, the ancillary display may support additional and/or different interfaces (e.g., high-definition multimedia interface (HDMI), 3.5 mm 4-conductor connector, 2.5 mm mono connector, universal serial bus (USB), etc.) than the electronic device. In some implementations, the additional and/or different interfaces supported by the ancillary display may be utilized by the electronic device while coupled to the ancillary display.

In some implementations, the ancillary display may be removably coupled to the electronic device by magnetic connectors. In some implementations, the ancillary display may be removably coupled to the electronic device by any number of other connectors (e.g., friction fit, snap fit, or the like). In yet other implementations, the display may be removably coupled to the electronic device by mini jack/headphone type jack connectors (e.g., tip ring sleeve (TRS) connectors, tip sleeve (TS) connectors, tip ring ring sleeve (TRRS) connectors), USB, HDMI or the like. In some implementations, the connectors (magnetic, headphone type, or otherwise) may allow the ancillary display to send and/or receive data communications to/from the electronic device via a wired data connection. In some implementations, the display may receive electrical power from the electronic device while coupled. However, in other implementations, the ancillary display may have a separate power source from the electronic device. Furthermore, in some implementations, the ancillary display may have wireless data transmission capabilities in order to communicate with the electronic device. In some implementation, the wireless data transmission capabilities may be used to supplement the wired data connection.

A hinged ancillary display may be implemented in many ways. Example implementations are provided below with reference to the figures.

FIG. 1 shows a perspective view of an example of ancillary display 102 configured to removably attach to electronic device 104. Ancillary display 102 is illustrated as substantially the same shape and size as electronic device 104; however, in some implementations, the ancillary display may be a shape and size different that the associated electronic device. In some implementations, ancillary display 102 may have a single display 106 as illustrated in FIG. 1. In other implementations, ancillary display 102 may have multiple displays for showing various types of graphical content.

The display 106 of the ancillary display 102 may be implemented using any suitable display technology. In some implementations the display 106 may be implemented with any of the electronic paper display examples described above (e.g., an electrowetting display or an electrophoretic display). In still another implementation, the display 106 of the ancillary display 102 may comprise an emissive display.

In some implementations, ancillary display 102 may include a hinge 108 to allow the ancillary display to act as a cover for the electronic device. In some implementations, the hinge may be a dual hinge which may allow one or more attachment mechanism or connectors 110(1)-(M) to remain coupled to the electronic device 104 while the ancillary display is in contact with a front surface 112 of the electronic device 104. As discussed in greater detail below, the one or more connectors 110(1)-(M) may provide a communication control allowing the ancillary display 102 and the electronic device 104 to transmit data and/or electrical current to each other.

The electronic device 104 is illustrated as a portable, handheld device, having a slate-like shape. As mentioned, electronic device 104 has a generally planar front surface 112 within which is a flat, two-dimensional display 114. In some implementations, the display 114 may include touch screen capabilities that allow user input through contact or gesturing relative to the display. The display 114 is shown in a generally rectangular configuration. However, it is understood that the display 114 may be implemented in any shape, and may have any ratio of height to width. In addition, the display 114 may be curved or otherwise non-linearly shaped.

In some implementations, the ancillary display 102 may be releasably attached to one or more communications ports located on a side surface of the electronic device 104. More specifically, the one or more connectors 110(1)-(M) as part of the hinge 108 may connect the ancillary display to the side surface of the electronic device 104. In some implementations, the electronic device 104 may have multiple receptacles or other elements that cooperate with the connectors 110(1)-(M) to fastener the ancillary display 102 to the electronic device 104. In addition to providing physical coupling, connectors 110(1)-(M) may function as a data communication channel to provide data communications between the ancillary display 102 and the electronic device 104. Further details and implementations concerning the one or more connectors 110(1)-(M) will be described in more detail below.

The display 114 of the electronic device 104 may be implemented using various technologies, including the ePaper technology mentioned above. In other implementations, the display 114 may also be implemented using monochrome or color technologies with LED (light emitting diode), LCD (liquid crystal display), OLED (organic light emitting diode), or other technologies that are available or may become available. Electronic paper displays that may be used with the implementations described herein include bi-stable LCDs, MEMS, cholesteric, pigmented electrophoretic, and others. In other implementations, or for other types of devices, the cover display 114 may further include a touch screen interface. In some implementations, a touch sensitive mechanism may be included with the display to form a touch-screen display.

In some implementations, the ancillary display 102 may have integral control logic or electronics to drive and control the display 106. Such control logic may range from very simple to relatively complex, depending on functional objectives and the types of content desired to be displayed on the display 106. In some implementations, the display 106 may communicatively couple to electronic device 104, and the electronic device 104 may control aspects of the display 106. In some implementations, the ancillary display 102 may have control logic that communicates with the electronic device 104 to determine information that will be displayed on the display 106.

Figure 2:
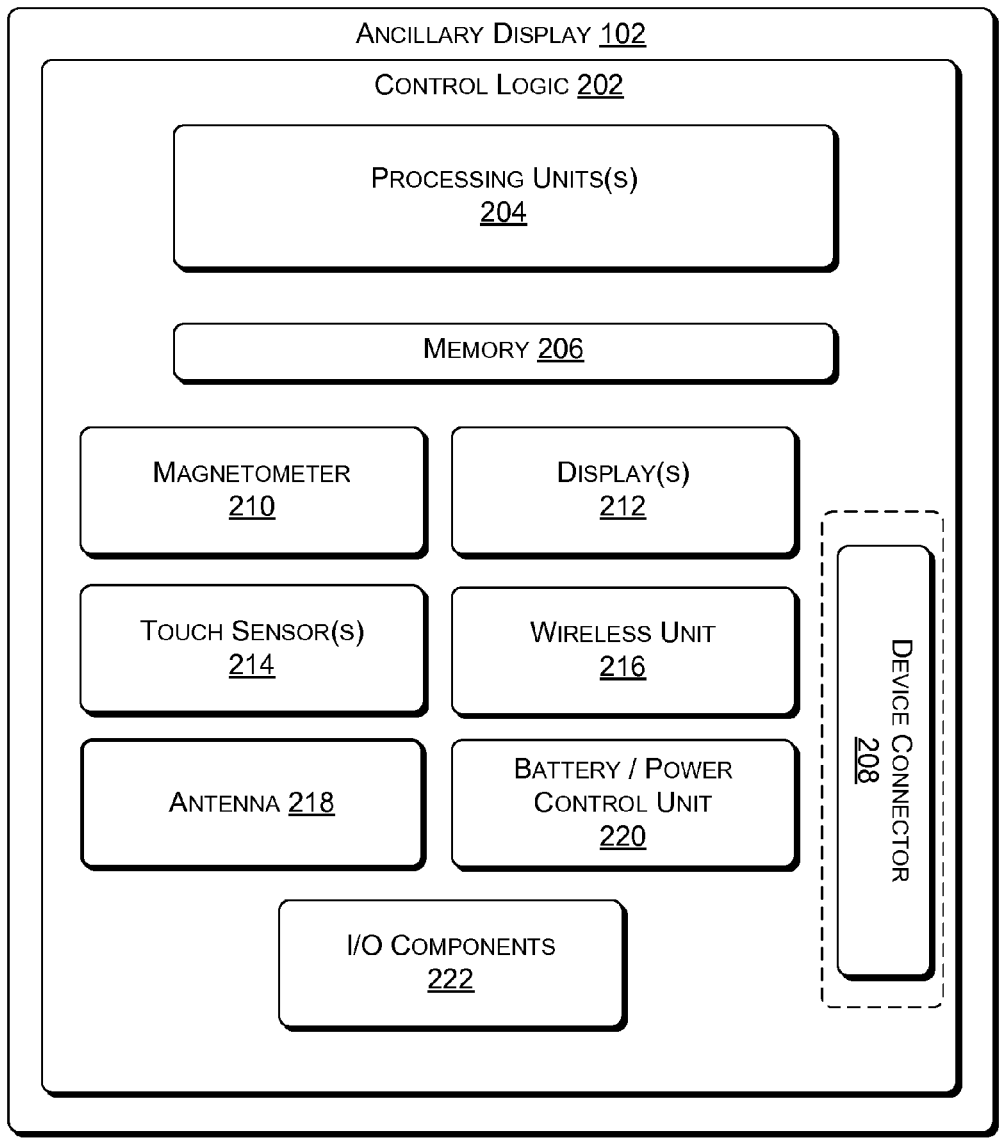
FIG. 2 illustrates selected components of an example ancillary display including a device connector.

FIG. 2 illustrates the example ancillary display 102 which may be coupled to an electronic device. In this example, the ancillary display 102 may have control logic 202 that controls operation of the display 106 and interacts with users and/or an associated electronic device to determine what to display on the display 106. The control logic 202 may comprise one or more processing units 204 and associated memory 206. Depending on the configuration of the ancillary display 102, the memory 206 (and other memories described throughout this document) is an example of computer storage media and may include volatile and nonvolatile memory. Thus, the memory 206 may include, but is not limited to, RAM, ROM, EEPROM, flash memory, or other memory technology, or any other medium which can be used to store media items or applications and data which can be accessed by the display 102.

The memory 206 may be used to store any number of functional components that are executable on the processing unit(s) 204, as well as data and content items that are rendered by ancillary display 102. Thus, in some implementations, the memory 206 may store an operating system and a storage database to store one or more content items. Furthermore, while the following description includes certain components located in the electronic device and other components in the ancillary device, in other implementations the arrangement of these components may vary between the device and the ancillary display.

In some implementations, the ancillary display 102 may include a device connector 208 for data communication with an associated electronic device. Physically, the device connector 208 may be integrated with the connectors 110(1)-(M), shown in FIG. 1. Electronically, the device connector 208 may use one or more existing wired communication protocols, such as a USB (universal serial bus). Alternatively, as described below, the device connector 208 may be implemented using the wireless unit 216 and antenna 218 for wireless communications.

A magnetometer 210 may also be included in ancillary display 102 and used in conjunction with device connector 208 to receive one or more signals indicating that one or more magnets associated with connectors 110(1)-(M) are in contact with electronic device 104.

FIG. 2 further illustrated that the ancillary display 102 may include one or more displays 212, which may be passive, emissive or any other form of display. In one implementation and as mentioned above, the display uses ePaper display technology, which is bi-stable, meaning that it is capable of holding text or other rendered images even when very little or no power is supplied to the display. Some examples electronic paper displays that may be used with the implementations described herein include bi-stable LCDs, MEMS, cholesteric, pigmented electrophoretic, and others. In other implementations, or for other ancillary display, the display may be embodied using other technologies, such as LCDs and OLEDs, and may further include a touch screen interface. In some implementations, a touch sensitive mechanism may be included with the display to form a touch-screen display.

Additionally, in some implementations, ancillary display 102 may include touch sensor(s) 214, which enables a user of ancillary display 102 to operate and interact with ancillary display 102 via touch gestures. In one implementation, the touch sensor(s) 214 may be placed behind, on top of, or integral with a touch screen layer of display 212, such that user input through contact or other gestures relative to display 212 may be sensed by the touch sensor(s) 214. In another implementation, the touch sensor(s) 214 may be placed in another part of ancillary display 102. For example, the touch sensor(s) 214 may be placed on a bezel, sides of the ancillary display, and/or the back of the ancillary display. In some instances, the touch sensor(s) 214 and the display 212 are integral to provide a touch-sensitive display that displays a user interface, applications, or content items and allows users to navigate via touch inputs. In some instances, the touch sensor(s) 214 are capable of detecting touches as well as determining an amount of pressure or force of these touch inputs.

In some implementations, the ancillary display 102 may include a wireless unit 216 coupled to an antenna 218 to facilitate a wireless connection to a network and/or an associated electronic device. The wireless unit 216 may implement one or more of various wireless technologies, such as cellular networks, radio, Wi-Fi networks, short range networks (e.g., Bluetooth), IR, RF, and so forth. For example, the antenna 218 may receive a wireless signal at the wireless unit 216 from an electronic device 104, the signal comprising data to be displayed on the display 106 of the ancillary display 102.

The example ancillary display may also include a battery and power control unit 220. The battery and power control unit operatively controls an amount of power, or electrical energy, consumed by the display. Actively controlling the amount of power consumed by the display may achieve more efficient use of electrical energy stored by the battery. As mentioned above, other implementations of the ancillary display may be configured without a battery. In those implementations, the power consumed by the ancillary display may be supplied by the battery and/or power control unit of an electronic device associated with the ancillary display.

The ancillary display 102 may further be equipped with various input/output (I/O) components 222. Such components may include various user interface controls (e.g., buttons, a joystick, a keyboard, etc.), a camera, a bar code reader, an image projector, audio speakers, a microphone, connection ports, and so forth.

Figure 3:
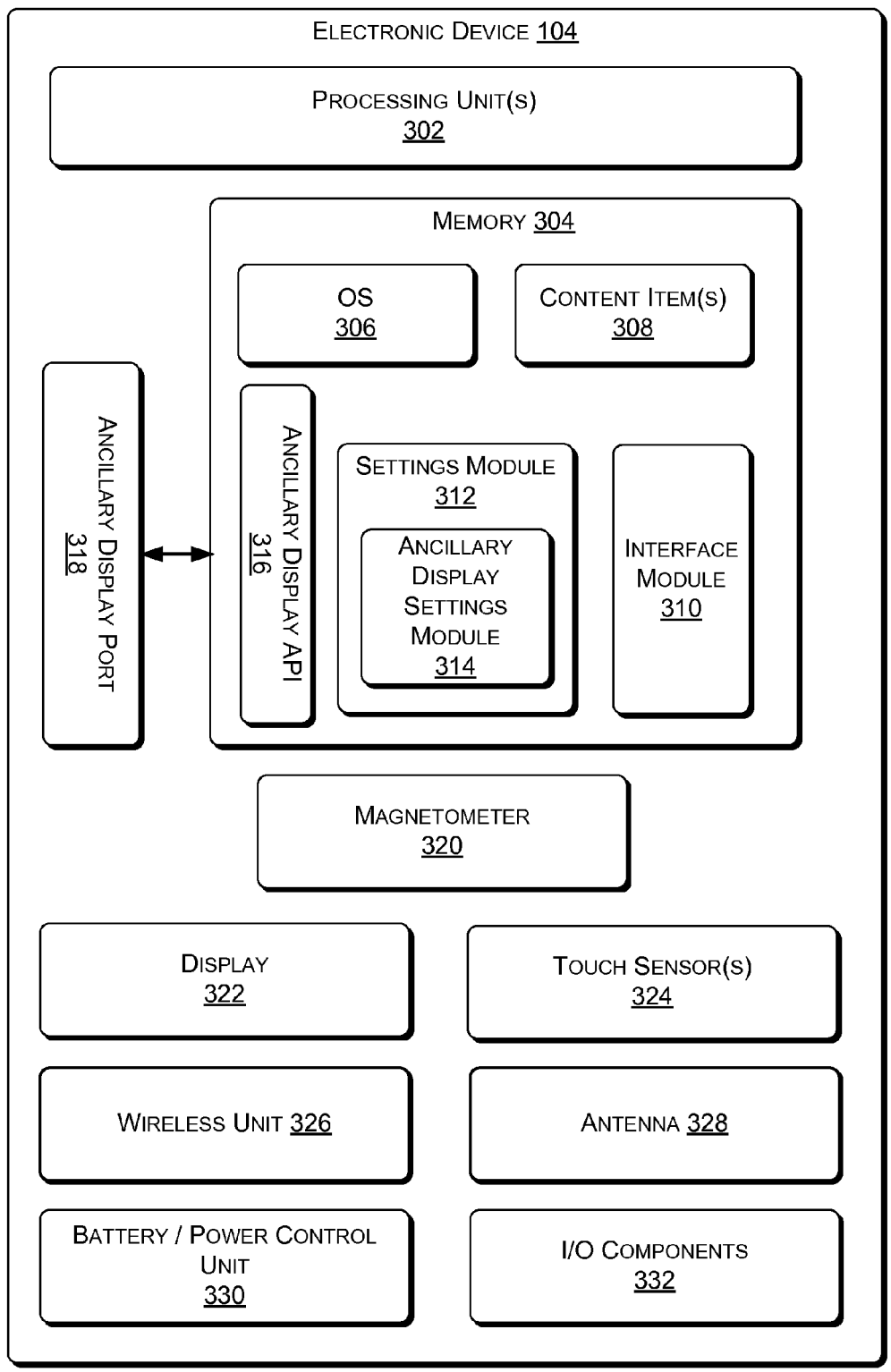
FIG. 3 illustrates selected components of an example electronic device including an ancillary display port.

FIG. 3 illustrates the example electronic device 104 which may be coupled to an ancillary display. The basic configuration of device 104 includes one or more processing units 302 and memory 304 as described above.

The memory 304 may be used to store any number of functional components that are executable on the processing unit(s) 302, as well as data and content items that are rendered by device 104 or ancillary display 102. Thus, the memory 304 may store an operating system 306 and a storage database to store one or more content items 308, such as eBooks, audio books, songs, videos, still images, and the like.

The operating system 306 may provide menus and other navigational tools to facilitate selection and rendering of the content items 308. The operating system 306 may further include a browser or other application that facilitates access to sites over a network, such as websites or online merchants. In addition, the operating system 306 may contain logic and modules for controlling the display 114, for rendering content items 308 on the display 114, and for navigating through content items 308 in response to user input.

An interface module 310 may also be provided in memory 304 and may be executed on the processing unit(s) 302 to provide for user operation of device 104. The interface module 310 may facilitate textual entry of requests (e.g., via a cursor, controller, keyboard, etc.), audible entry of requests (e.g., via a microphone), or entry of requests in any other manner.

The memory 304 may also include a settings module 312 to facilitate personalization of device 104 to the user. For example, settings module 312 may store device registration, device name, Wi-Fi settings, device password, and the like. In some implementations, the settings module 312 may include an ancillary display settings module 314. The ancillary display settings module 314 may store settings user's settings related to one or more previously associated ancillary displays. For example, the ancillary display settings module 314 may store a user's desired communication mode (i.e., Bluetooth) with an ancillary display.

The memory 304 may include an application programming interface (API) 316, referred to herein as an ancillary display API 316, that can be called by the ancillary display 104 for interaction between the ancillary display 104 and the electronic device 104. Although the ancillary display API 316 may be implemented by the memory 304, it is shown explicitly in FIG. 3 for purposes of discussion. Also note that the ancillary display API 316 may be implemented as part of the operating system 308 in some implementations.

FIG. 3 further illustrated that the device 104 may include an ancillary display port 318 for data communication and/or power transfer with an associated ancillary display. Specifically, as described below, ancillary display port 318 of electronic device 104 may couple to device connector 208 of the ancillary display to provide such data communication and/or power transfer. In some implementations, data communication is further aided by ancillary display API 316 in the memory 304 of electronic device 104.

In some implementations, the electronic device may include a magnetometer 320 used in conjunction with ancillary display port 318 to receive one or more signals indicating that one or more magnets associated with connectors 110(1)-(M) are in contact with electronic device 104. In some implementations, magnetometer 320 may receive one or more signals from one or more magnets associated with the ancillary display when the display of the ancillary display is in contact with the electronic device. For example, magnetometer 320 may detect that magnets embedded within layers of the ancillary display to determine that the ancillary display covers a portion of the display of the electronic device.

FIG. 3 further illustrated that the device 104 may include display 322, touch sensor(s) 324, wireless unit 326, antenna 328, battery/power control unit 330 and I/O components 332. Such components may be implemented as described above with regard to the components of the example ancillary display in FIG. 2.

Note that only a general configuration of an ancillary display and electronic device is illustrated, showing high level components most relevant to this discussion. Both the ancillary display 102 and the electronic device 104 may be implemented in many different ways other than the specific implementation shown here.

Figure 4:
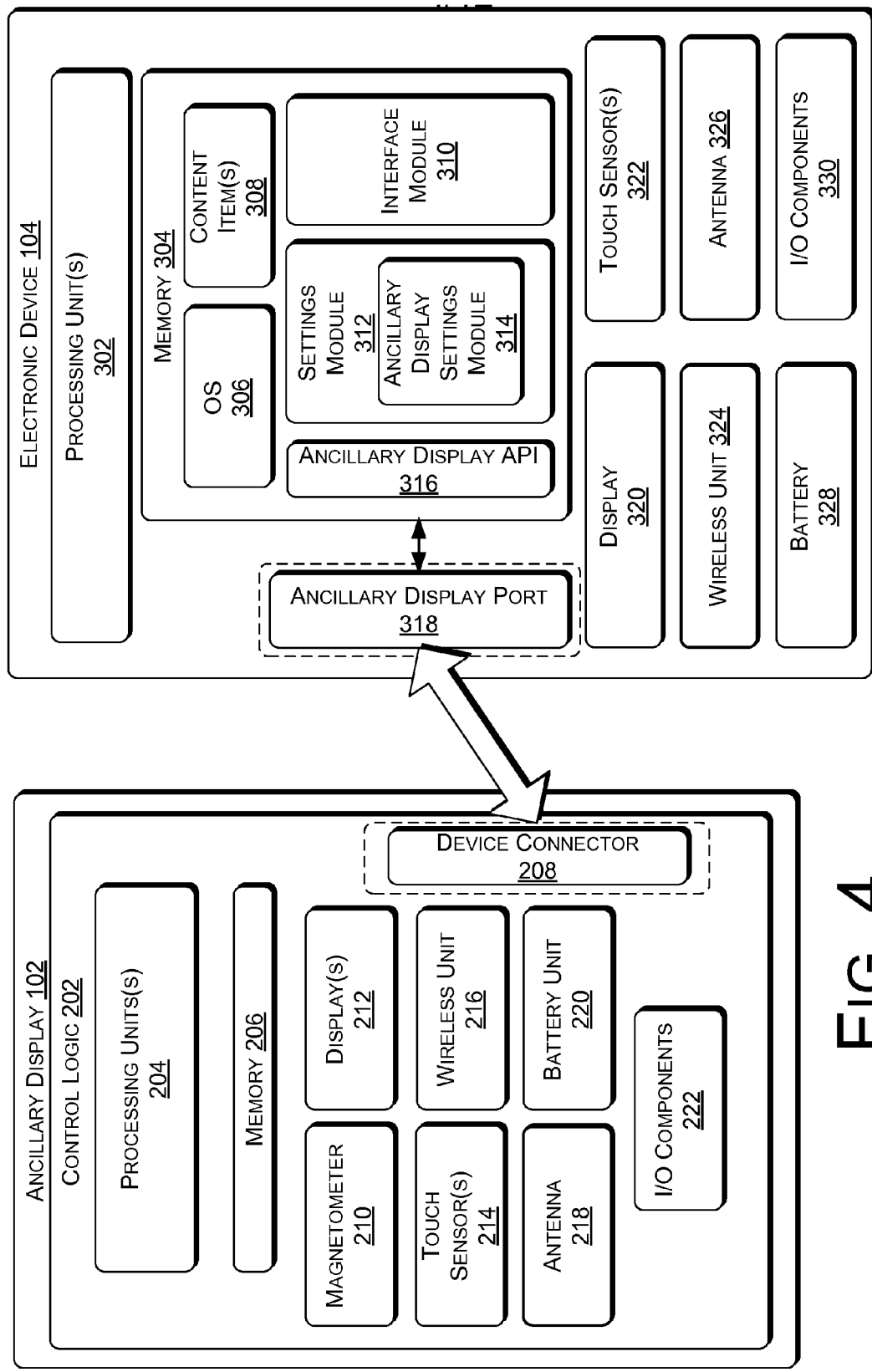
FIG. 4 illustrates how the ancillary display and the electronic device may connect via attachment of a device connector on the ancillary display to a port on the electronic device.

FIG. 4 illustrates an example coupling of ancillary display 102 and electronic device 104. As mentioned above, the device connector 208 of the ancillary display 102 may connect to ancillary display port 318 of the electronic device. In some implementations, the ancillary display 102 periodically queries the electronic device 104, using the ancillary display API 316 via the device connector 208 and the ancillary display port 318, to obtain content data for display on the ancillary display. The ancillary display receives the content data and, in some implementations, displays it on the one or more displays 210. While the ancillary display 102 may obtain the content data from the electronic device 104 in some instances, in other instances the ancillary display 102 may obtain the content data from a remote source, such as wirelessly over the Web.

In addition to the content data, the ancillary display 102 may obtain configuration information or commands from the electronic device 104, containing specific instructions or information regarding the desired behavior of the ancillary display 102.

In different implementations, specific operational behavior of the ancillary display 102 may be dictated by either the ancillary display itself or the electronic device 104. Responsibility for updates may also be placed with either the ancillary display 102 or the electronic device 104. Generally, the various functionality described herein can be under the control of either the ancillary display 102, the electronic device 104, or some combination of the two. Similarly, communications may be initiated by either the ancillary display 102, the electronic device 104, or both.

FIG. 5 illustrates an example view 500 of the ancillary display 102 coupled to the electronic device 104. FIG. 5 also illustrates cut-away areas 502 and 504 showing the groups of connectors 110(1)-(2) and 110(3)-(5) of the ancillary display 102 interacting with the electronic device 104. More specifically, each connectors 110(1)-(5) within the groups of the ancillary display 102 may be interacting with the ancillary display port 318 of the electronic device 104.

FIGS. 6A and 6B illustrate two example views of the ancillary display 102 employing hinge 108 to act as a cover for the electronic device 104. Specifically, FIG. 6A illustrates a top view of the ancillary display 102 in position substantially parallel to the electronic device 104 and covering the front surface 112 of the electronic device 104. While, FIG. 6B shows a side or hinge view of FIG. 6A.

In some implementations, the hinge 108 may be a double axis hinge meaning that the hinge may allow for two separate parallel axes of rotation and each axis of the double axis hinge may be configured to move relative to a position of the other axis. In some implementations, one of the axes of the double axis hinge may be integrated with the body of the ancillary display while the other of the axes may integrated with a pivot body housing the one or more connector 110(1)-(M). In some implementations, the double axis hinge may allow the ancillary display to cover a display and/or back surface of the electronic device while the one or more connector 110(1)-(M) of the pivot body may remain connected to the electronic device. In other implementations, the hinge may be a single pivot hinge, a floating hinge, a lift-off hinge or a spring hinge.

As illustrated, the hinge 108 may include caps 602 and 604 at each end of the hinge 108. Each of the caps 602 and 604 may be configured to hold one of dowel pins 606 and 608. For ease of illustration, caps 602 and 604 are illustrated as generally rectangular cuboids with rounded corners. In other implementations, the caps may be any other suitable shape including, but not limited to, flat polygon shapes designed to reduce snagging on user's clothing, purse, carrying bag, etc.

Dowel pins 606 and 608 are illustrated as traveling the entire length of the hinge 108 from cap 602 to cap 604. However, in other implementations, each of the dowel pins may travel a length less than the entire length of the hinge. In some implementations, dowel pins 606 and 608 may be permanently attached to each of caps 602 and 604. In other implementations, the caps 602 and 604 may be decoupled from dowel pins 606 and 608.

As illustrated, dowel pins 606 and 608 may pass through an opening on each of a connection body 610 and an ancillary display spine 612. The opening on each of the connection body 610 and the ancillary display spine 612 may be slightly larger (e.g., have a greater diameter) than each of the dowel pins 606 and 608. In this implementation, this may allow the dowel pins 606 and 608 to move (e.g., rotate) relative to each opening.

In some implementations, ancillary display spine 612 may be formed as part of the bezel or body of ancillary display 102. While connection body 610 may be formed apart from the ancillary display 102. As illustrated in FIG. 6A, the connection body 610 may include the one or more connector 110(1)-(M). In some implementations, the connection body 610 may include wires, contacts, flexible printed circuits, or other connections to provide a pathway to facilitate data communication and/or electrical transmission between the ancillary display 102 and the electronic device 104 as described above.

In some implementations, the caps, pins, ancillary display spine and connection body may be formed of any durable plastics, metals or combinations thereof.

Note that only a general configuration of a hinge of an ancillary display is illustrated, showing components most relevant to this discussion. The hinge of an ancillary display may be implemented in many different ways other than the specific implementation shown here.

Figure 7:
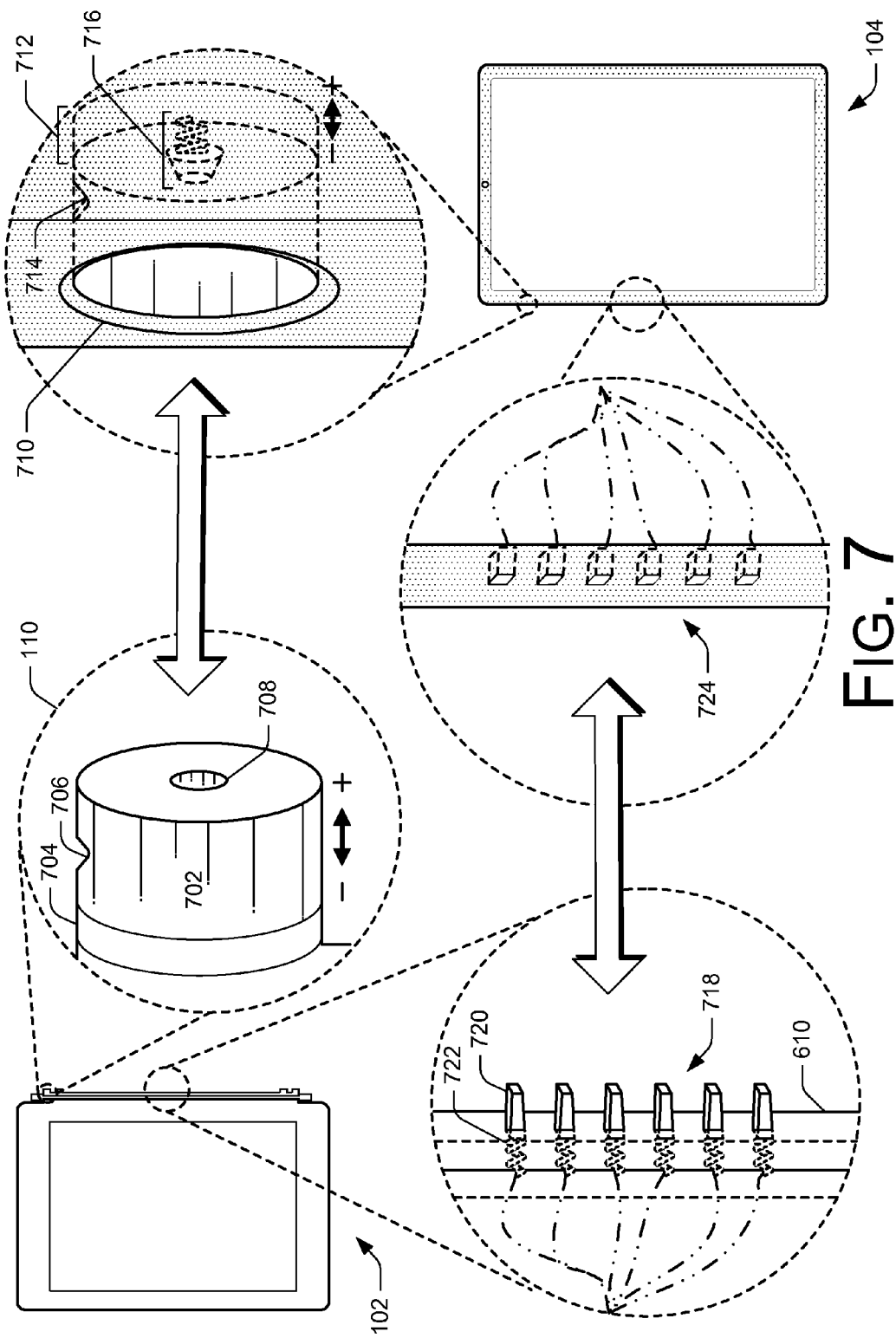
FIG. 7 illustrates an enlarged view of various connectors which may be used to attach an ancillary display to an electronic device.

FIG. 7 illustrates an example of the one of the connectors 110(1)-(M), otherwise called attachment mechanisms, which may provide mechanical and/or electrical coupling between ancillary display 102 and electronic device 104. In implementations where the ancillary display receives its power from the electronic device, power may be supplied through the connector 110. In some implementations, connector 110 (and any other connector described herein) may be configured to allow the ancillary display and the electronic device to communicate with each other to determine ancillary display content. In some implementations, the connector may provide power, communications, or both.

FIG. 7 illustrates an exploded view of an example connector 110 of ancillary display 102. In some implementations, the body 702 of connector 110 may be composed substantially of a magnet. As illustrated the polarity of the body 702 may run from negative at the base of connector 110 to positive at the tip of connector 110. In some implementations, the connector 110 may have an insulator 704 to prevent an electrical current from transferring to any surface portion of the ancillary display.

In some implementations, connector 110 may include a side contact notch 706 to provide an additional contact for data and/or electrical transmission when coupled to electronic device 104. In other implementations, the side contact notch 706 may provide a mechanism to ensure proper alignment and security when the connector 110 is coupled to the electronic device 104.

In some implementations, connector 110 may include a central orifice 708 as part of the device connector 208. In some implementations, the central orifice 708 may also provide a mechanism to ensure proper alignment when the connector 110 is coupled to the electronic device 104. In other implementations, the central orifice 708 may provide a location for data and/or electrical transmission when coupled to electronic device 104.

As further illustrated in FIG. 7, connector 110 may be configured to slide into one or multiple cavities 710 location on a side surface of electronic device. In some implementations, cavity 710 may include magnet 712 location at the base of the cavity 710. In some implementations, the magnet 712 may be configured with a polarity such that the base surface of cavity 710 is negative. In this implementation, the negative polarity of the base surface of cavity 710 may be configured to interact attract and/or hold the positive polarity of the tip of body 702 of the connector 110 on the ancillary display 102. In some implementations, each of the multiple cavities positioned on the electronic device may include a protective removable cover to prevent dirt, debris, other object from entering a cavity. In other implementations, the connector 110 may be configured to attach to a magnetic surface located on an outer surface of the electronic device.

In some implementations, cavity 710 may include a side leaf 714 configured to interact with the side contact notch 706 of connector 110. In some implementations, the side leaf 714 may be fixed (i.e., not movable); however, in other implementations, the side leaf 714 may include a spring or other mechanism to allow the side leaf 714 to depress when the connector 110 is slid into the cavity 710. In this implementation, when the connector is slid into place relate to the cavity 710, the side leaf 714 may spring into the side contact notch 706 on the connector 110 and secure the ancillary display 102 relative to the electronic device 104.

In yet another implementation, cavity 710 of the electronic device 104 may include a spring detent 716 as part of ancillary display port 318. Spring detent 716 may be configured to interact and/or receive the central orifice 708 of the connector 110. In some implementations, the spring detent 716 may be positioned within a central portion of magnet 712 at the base of cavity 710. In some implementations, the spring detent 716 may provide a connectivity point to transfer data communications and/or electrical transmission from the electronic device 104 to the connector 110 of the ancillary display 102. In some implementations, at least a portion of the spring detent 716 may be configured to provide a data communication and/or electrical pathway. For example, the spring detent 716 may comprise a conductive material, may be plated with a conductor, and so forth.

FIG. 7 further illustrates an example pogo pin array 718 that may be used in conjunction to provide a data communication and/or electrical transmission pathway between the electronic device 104 and the ancillary display 102. In some implementations, pogo pin array may provide the sole transmission pathway between the electronic device 104 and the ancillary display 102, while the multiple connectors 110(1)-(M) provide the mechanical coupling. The pogo pin array 718 is illustrated as being centrally positioned on the connection body 610; however, in other implementations, the pogo pin array 718 may be positioned at any point on connection body 610.

As illustrated in FIG. 7, the pogo pin array 718 may include a plurality of pins 720. It should be noted that any number of pins may be included in a pogo pin array. Additionally or alternatively, the pogo pin array may be on the electronic device, while the contacts may be on the ancillary display. In yet another implementation, the pins of an array may alternate with contact point on both an ancillary display and electronic device in an opposite manner such that a pin on the ancillary display corresponds to a contact point on the electronic device, and vice versa. Furthermore, in some implementations, each of the plurality of pins may be composed of a suitably conductive material, such as aluminum, conductive plastic, and so forth. In some implementations, each of the plurality of pins may be bent pins. Pins may be configured with a geometry differing from the pins 720. For example, the pins might be shorter in some implementations.

In some implementation, each pin 720 in the pogo pin array 718 may include a spring 722 which may allow the pin to resist and/or arrest movement of each pin relative to the ancillary display 102. Such spring 722 may also allow each pin 720 to remain in contact with the one or more contact points 724 on the electronic device 104 as described below.

In some implementations, each of the pins 720 may be configured to interact with a corresponding contact point 724 located on the spine of electronic device 104. Contact points 724 are illustrated as openings to accept the head of a corresponding pin 720. However, it other implementations, each of the contact points 724 may be a substantially flush with the spine of electronic device 104. For example, each contact point 724 may be a small area of conductive material to interact with a head of a corresponding pin 720.

Figure 8:
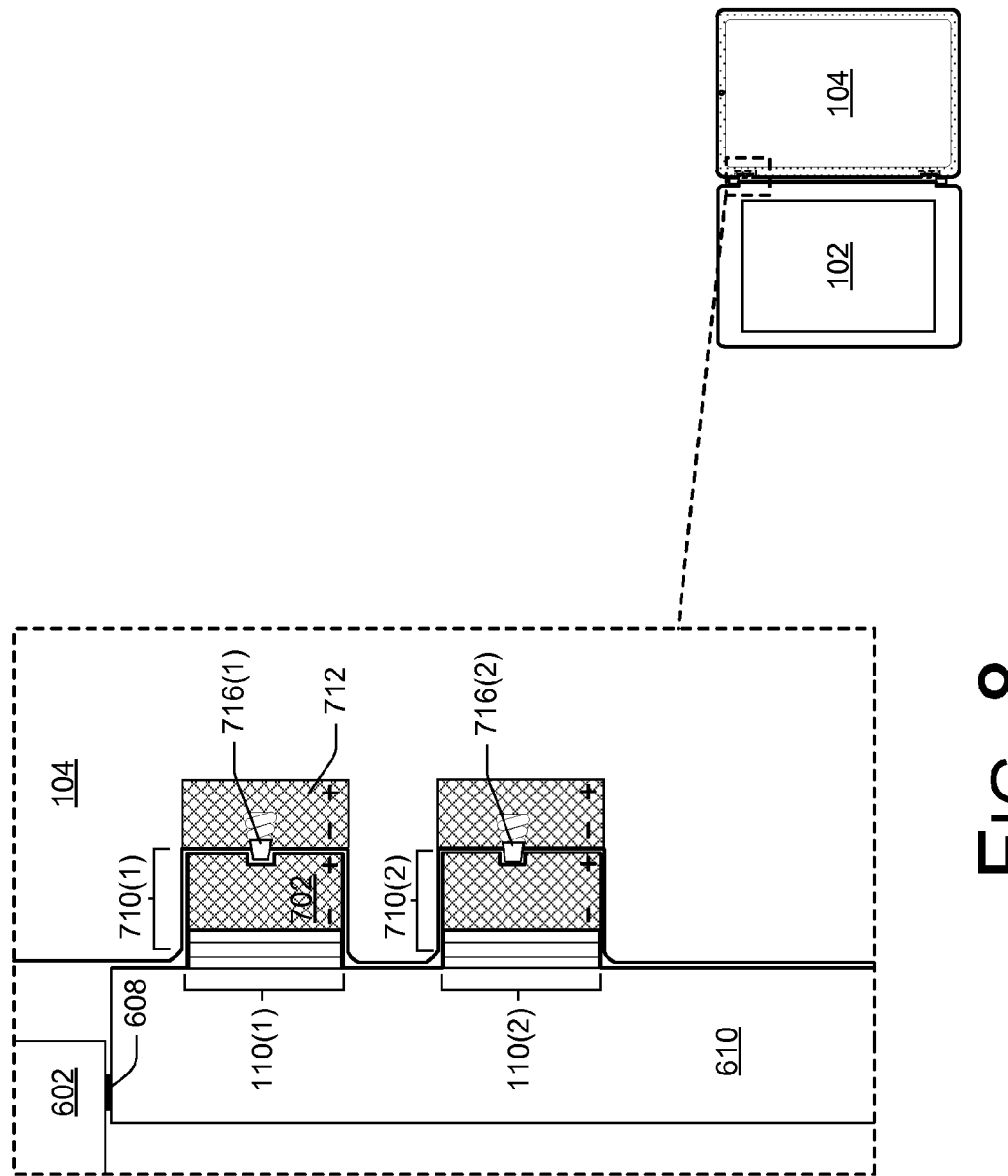
FIG. 8 illustrates an enlarged cutaway view of a magnetic connector used to connect an ancillary display to an electronic device with spring detents.

FIG. 8 depicts an enlarged cutaway view of the connectors 110(1) and 110(2) of the connection body 610 as coupled to electronic device 104. This cutaway view illustrates two connectors as part of the top portion of connection body 610. In other implementations, more connectors may be used to connect the ancillary display to the electronic device.

As illustrated, each connector 110(1) and 110(2) on the connection body 610 may be configured to slide into cavities 710(1) and 710(2), respectively, on the electronic device 104. More specifically, magnetic body 702 of the connector 110(1) is slide into cavity 710(1) until positive polarity of the tip of the body 702 is coupled to the negative polarity of the magnet 712 at the base of cavity 710(1). In some implementations, once magnet 702 and magnet 712 are in contact the magnetometers associated with the device connector 208 of the ancillary display and ancillary display port 318 of the electronic device may send a signal notifying the control logic 202 of the ancillary display and memory 304 of the electronic device 104 that coupling has occurred. In some implementations, an identification of either the ancillary display and/or electronic device may be recognized by the other. For example, upon coupling, the electronic device may recognize a brand, display type, previous association, etc. of an ancillary display.

In some implementations, when the each connector 110(1) and 110(2) on the connection body 610 are slide into cavities 710(1) and 710(2) on the electronic device 104, spring detents 716(1) and 716(2) may be depressed. In some implementations, upon depressing the spring detent 716(1) and 716(2) (and any other spring detents in located in the bottom portion of the electronic device) the device connector 208 interface with ancillary display port 318 may be complete. In other implementations, spring detent may work in conjunction with a pogo pin array to complete such connector/port interface.

Figure 9:
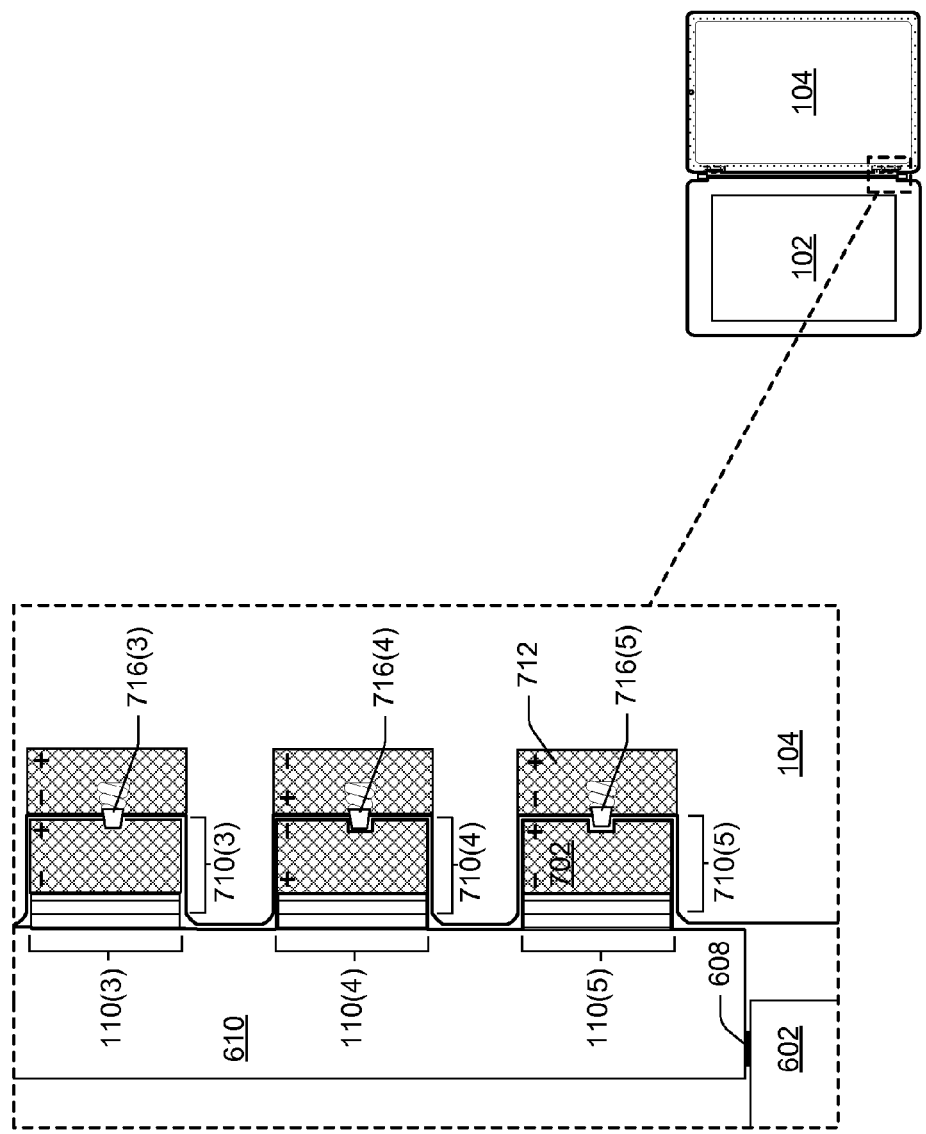
FIG. 9 illustrates an enlarged cutaway view of magnetic connectors where the magnetic connectors may have a different sequential magnetic orientation.

FIG. 9 depicts the connectors 110(3), 110(4) and 110(5) of the connection body 610 as coupled to electronic device 104. This cutaway view illustrates three connectors as part of the bottom portion of connection body 610. In other implementations, more connectors may be used to connect the ancillary display to the electronic device. In some implementations, the top portion and bottom portion of electronic device may have the same or different number of connectors.

Each connector 110(3)-(5) may be configured as described above with regard to FIG. 8. In some implementations, the orientation of each connector may vary and/or alternate. For example, connectors 110(3) and 110(5) may have a magnetic orientation opposite of connector 110(4). However, any number of magnetic orientations may be utilized in other implementations. In yet another implementation, one or more connectors 110(1)-(M) may be passive or non-magnetic. In such implementations, the passive connectors may be configured to align the ancillary display with the electronic device.

Figure 10:
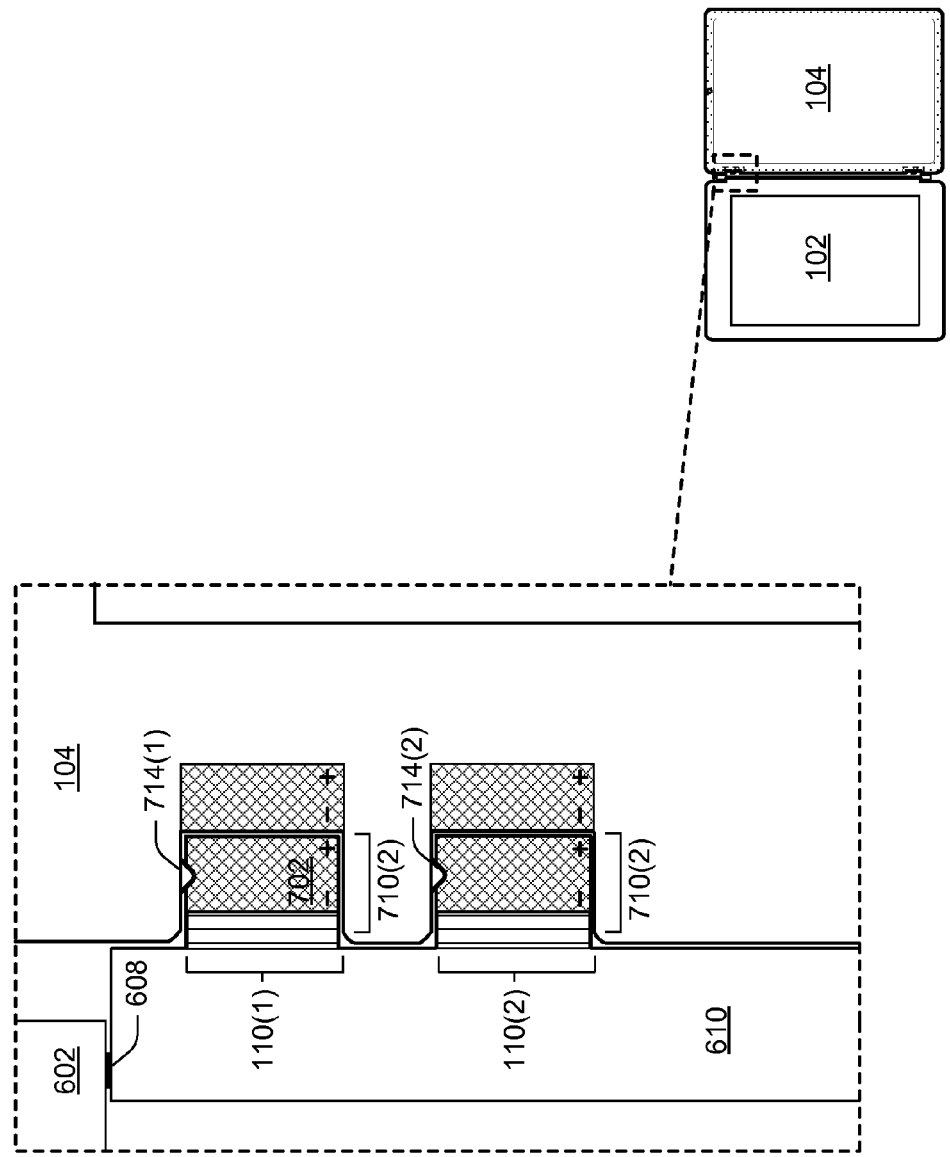
FIG. 10 illustrates an enlarged cutaway view of a magnetic connector used to connect an ancillary display to an electronic device with side contacts.

FIG. 10 depicts an enlarged cutaway view of another example implementation of the connectors 110(1) and 110(2) of the connection body 610 as coupled to electronic device 104.

As illustrated, each connector 110(1) and 110(2) on the connection body 610 may be placed into cavities 710(1) and 710(2) on the electronic device 104. In some implementations, each connector 110(1) and 110(2) may include side leaf 714(1) and 714(2) respectively as described above with regard to FIG. 7. In this implementation, each side leaf 714(1) and 714(2) (and any other side leaves located in the bottom portion of the connection body 610) may be configured to interact with a corresponding side contact notch 706 (not labeled in FIG. 10).

In some implementations, an interaction between the side leaves 714(1) and 714(2) and corresponding side contact notches may provide a mechanism to secure the ancillary display to the electronic device. Additionally or alternatively, interaction between the side leaves 714(1) and 714(2) and corresponding side contact notches may provide pathway which data communications and/or electric transmission are passed between the electronic device and ancillary display.

In some implementations, upon contact between the side leaves 714(1) and 714(2) and corresponding side contact notch, the device connector 208 interface with ancillary display port 318 may be complete. In other implementations, side leaves 714(1) and 714(2) may work in conjunction with a pogo pin array to complete such connector/port interface allowing communication between the ancillary display and electronic device.

Figure 11:
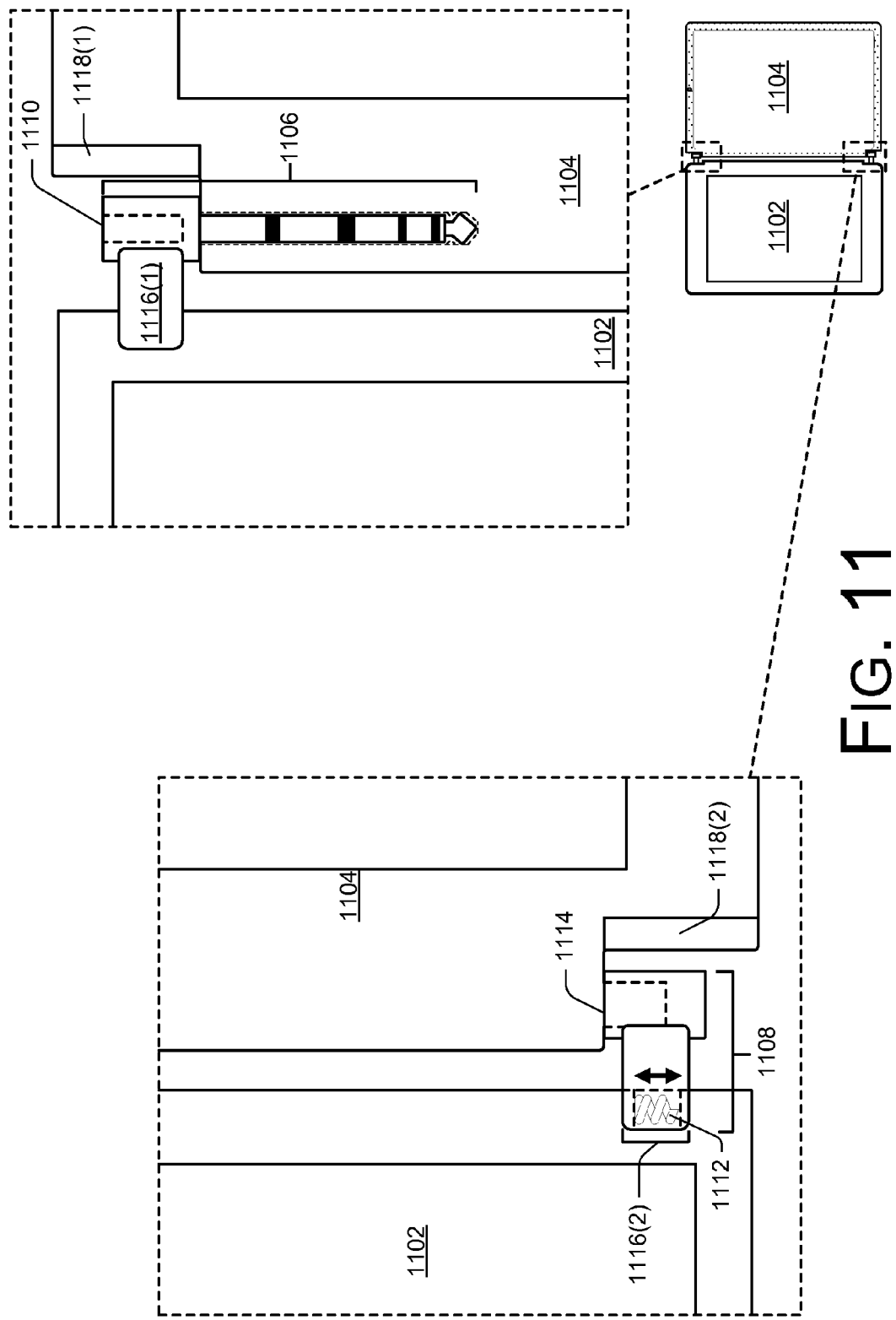
FIG. 11 illustrates an enlarged cutaway view of a mini jack connector and slide mechanism used to connect an ancillary display to an electronic device.

FIG. 11 depicts an enlarged cutaway view of yet another example implementation of connecting ancillary display 1102 with the electronic device 1104.

As illustrated in FIG. 11, ancillary display 1102 includes jack connector 1106 and slide mechanism 1108. Jack connector 1106 may include a mini jack/headphone type jack connector (e.g., tip ring sleeve (TRS) connectors, tip sleeve (TS) connectors, tip ring ring sleeve (TRRS) connectors) to attach the ancillary display 1102 to the electronic device 1104. In some implementations, jack connector 1106 may include a port 1110 which may allow for attachment and functionality of a device accessory (e.g., headphone, microphone, etc.) while the ancillary display is attached to the electronic device.

In some implementations, the connector 1106 may be positioned at the top of the ancillary display 1102, while the slide mechanism 1108 may be positioned at the bottom of the ancillary display opposite the jack connector 1106. In other implementations, the orientation of the jack connector 1106 and slide mechanism 1108 may be reversed.

In some implementations, jack connector 1106 may be configured to interact with a location on the electronic device 1104. In some implementations, the location on the electronic device 1104 may be sunken to provide a secure interaction. In other implementations, the interaction between the jack connector 1106 and electronic device 1104 may be secured by magnets. In some implementations, an interaction between the jack connector 1106 and the electronic device may provide a pathway which data communications and/or electric transmission are passed between the electronic device and ancillary display. Jack connector 1106 may also be configured with an extended length to provide structural support as the ancillary display is manipulated relative to the electronic device.

Slide mechanism 1108 may be configured to secure ancillary display 1102 to the electronic device 1104 once jack connector 1106 is placed within electronic device 1104. In some implementations, slide mechanism 1108 may be configured with a spring 1112 which may allow the slide mechanism 1108 to be manipulated such that it may be placed over securing protrusion 1114 on electronic device 1104. In some implementations, slide mechanism 1108 and securing protrusion 1114 and/or another location of the electronic device 1104 may be configured to secure the slide mechanism relative to the securing protrusion by magnetic force. In some implementations, the slide mechanism 1108 may include a jack connector as described above.

In some implementations, an interaction between the slide mechanism 1108 and the electronic device may provide a pathway which data communications and/or electric transmission are passed between the electronic device and ancillary display. In some implementations, ancillary display 1102 may be configured with a swivel axis relative to electronic device where the axis may be coaxial with the centerline of the jack connector 1106 and slide mechanism 1108.

In some implementations, jack connector 1106 and slide mechanism 1108 may include a flexible hinge 1116(1) and 1116(2), respectively. In some implementations, each hinge may be configured to allow the ancillary display 1102 to cover portion of the display of the electronic device 1104 while the ancillary display is physically coupled to the electronic device by jack connector 1106 and slide mechanism 1108. In some implementations, the electronic device 1104 may include angled areas 1118(1) and 1118(2). Angled areas 1118(1) and 1118(2) may be configured to reduce angle restriction for the hinge 1116(1) and 1116(2) while the ancillary display covers a portion of the electronic device.

Figure 12:
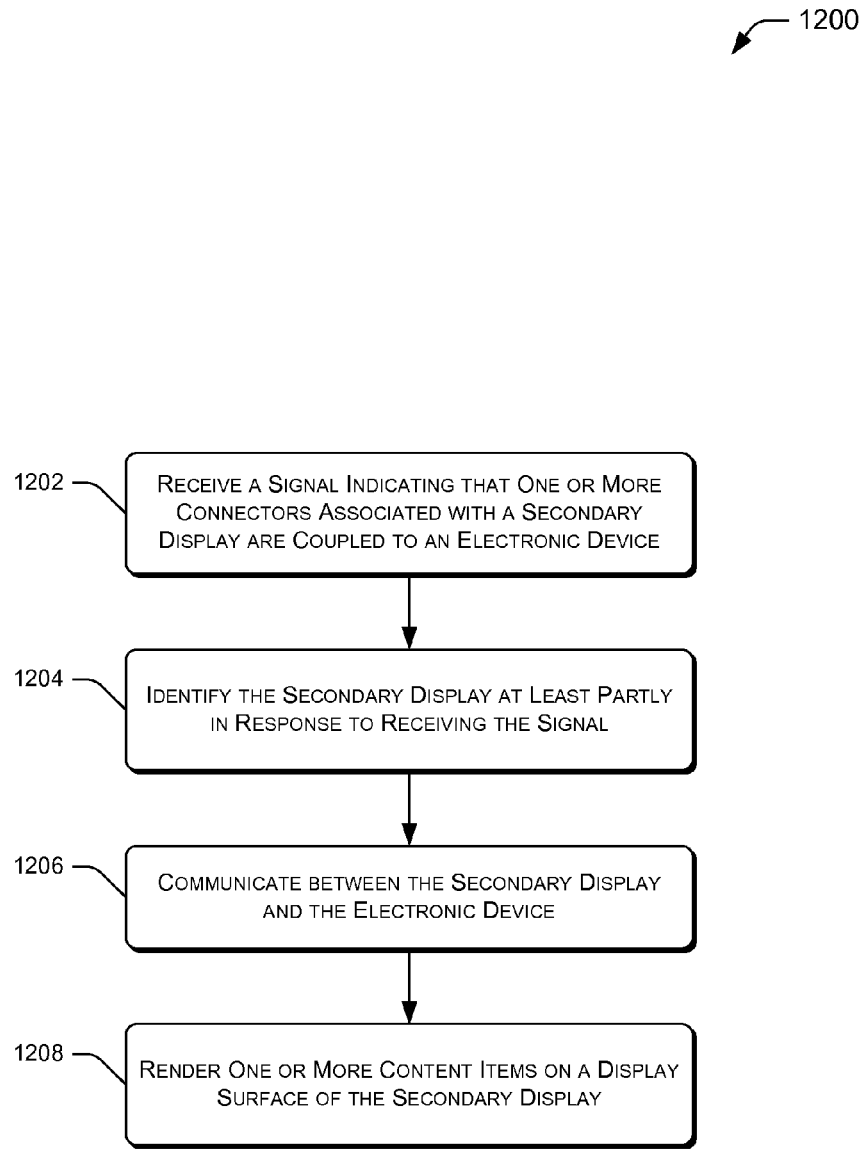
FIG. 12 is a flow diagram illustrating an example process for using an ancillary display in conjunction with an electronic device.

FIG. 12 illustrates an example process 1200 for implementing the techniques described above of using an ancillary display with an electronic device. The process 1200 is illustrated as a logical flow graph, each operation of which represents a sequence of operations that can be implemented in hardware, software, or a combination thereof. Process 1200 may be performed, e.g., by ancillary display 102 of FIG. 2 and/or by electronic device 104 of FIG. 3. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. Finally, the order in which the operations are described is not intended to be construed as a limitation, and any number of the described operations can be combined in any order and/or in parallel to implement the process.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 1200, at 1202, causes the electronic device to receive one or more signals indicting that one or more connectors associated with an ancillary display are coupled to the electronic device. For example, in the context of FIG. 7, a magnetometer associated with the electronic device may monitor for an indication that each of the magnetic connectors of the ancillary display have contacted an associated cavity on the electronic device.

At 1204, the electronic device identifies the secondary display. In some implementations, such identification includes determining a display technology of the display screens of the ancillary display and/or determining whether the ancillary display has been previously coupled to the electronic device, determining setting for the ancillary display, among others.

At 1206, the secondary display and the electronic device communicate. In some implementations, such communication may include data communication regarding content items and/or electrical communications to provide power to the ancillary display.

At 1208, one or more content items may be rendered on a display of the ancillary display at least partly in response to the communication.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An ancillary display configured to attach to an electronic device that includes an emissive display, the ancillary display comprising:
   an electronic paper display;
   a hinge having two parallel axes of rotation configured to allow the ancillary display to transition between a closed position in which the ancillary display at least partly covers the primary display of the electronic device and an open position in which the ancillary display does not cover the primary display of the electronic device;
   a first magnetic connector and a second magnetic connector that detachably couple the ancillary display to the electronic device, the first magnetic connector having a first polarity that is different from a second polarity of the second magnetic connector, at least one of the first magnetic connector or the second magnetic connector is configured to:
      provide a data communications pathway for providing data between the ancillary display and the electronic device; and
      provide an electrical pathway for supplying power to the ancillary display from the electronic device.

2. The display as recited in claim 1, wherein the data communications pathway provides one or more wired data communications between the ancillary display and the electronic device.

3. The display as recited in claim 2, further comprising a wireless unit and antenna for providing wireless data communications between the ancillary display and the electronic device.

4. The display as recited in claim 1, wherein first axis of two parallel axes of rotation of the hinge is integrated with a body of the ancillary display and a second axis of the two parallel axes of rotation is integrated with a hinge body and each of the two parallel axes is configured to move relative to a position of the other to allow the first magnetic connector and the second magnetic connector to couple to the electronic device while the ancillary display covers the primary display of the electronic device.

5. The display as recited in claim 1, wherein the electronic paper display comprises an electrophoretic display, a gyricon display, an electrowetting display, an electrofluidic display, an interferometric modulator display, or a cholestric liquid crystal display.

6. An ancillary display for an electronic device, the ancillary display comprising:
   one or more displays;
   a plurality of attachment mechanisms configured to provide an electrical transmission pathway to supply electrical power to the ancillary display from the electronic device;
   a hinge having a first axis of rotation and a second axis of rotation, the first axis of rotation allowing the plurality of attachment mechanisms to couple to the electronic device while the second axis of rotation allows the ancillary display to at least partly cover a primary display of the electronic device; and a magnetic field sensor to detect a magnetic field generated by a plurality of magnets embedded within the ancillary display, the magnetic field sensor providing an indication that the ancillary display covers a portion of the primary display.

7. The ancillary display as recited in claim 6, wherein at least one of the one or more displays comprises a reflective display and the primary display of the electronic device comprises an emissive display.

8. The ancillary display as recited in claim 6, wherein each of the one or more displays on the ancillary display comprises an electronic paper display while the primary display of the electronic device comprises a liquid crystal display.

9. The ancillary display as recited in claim 6, wherein the plurality of attachment mechanisms are configured further to provide a data transmission pathway between the ancillary display and the electronic device.

10. The ancillary display as recited in claim 6, further comprising a wireless unit and antenna for providing a wireless data transmission pathway configured to transmit data between the ancillary display and the electronic device.

11. The ancillary display as recited in claim 6, wherein
the magnetic field sensor is a magnetometer to detect a magnetic field generated by the plurality of magnets.

12. The ancillary display as recited in claim 6, the plurality of attachment mechanisms comprise at least one of:
a plurality of magnetic connectors where each of the magnetic connectors has a polarity opposite an adjacent magnetic connector;
a pogo pin array having a plurality of pins configured to remain in contact with the electronic device while the ancillary display at least partly covers a primary display of the electronic device; or
one or more jack connectors having a port to allow attachment of a device accessory while the ancillary display is coupled to the electronic device.

13. A secondary display configured to physically couple to an electronic device comprising a primary display and configured to supplement content displayed on the primary display of the electronic device, the secondary display comprising:

one or more displays;

a coupling over which power is received from the electronic device when the secondary display is physically coupled to the electronic device;

a magnetic field sensor to detect a magnetic field generated by a plurality of magnets embedded within the secondary display, the magnetic field sensor providing an indication that the secondary display covers a portion of the electronic device; and a wireless data transmission interface to transmit data between the secondary display and the electronic device.

14. The secondary display as recited in claim 13, wherein one of the one or more displays comprises an electrowetting display or an electrophoretic display.

15. The secondary display as recited in claim 13, wherein each of the one or more displays of the secondary display comprises a bi-stable display and the primary display of the electronic device comprises a liquid crystal display.

16. The secondary display as recited in claim 13, wherein the primary display of the electronic device comprises an emissive display.

17. The secondary display as recited in claim 13, wherein the coupling comprises two or more groups of magnetic connectors configured to attach to a plurality of corresponding magnetic cavities on the electronic device.

18. The secondary display as recited in claim 13, wherein the coupling comprises at least one of an array of pogo pin contacts, one or more jack connectors, a universal serial bus connector or a high-definition multimedia interface.

19. The secondary display as recited in claim 13, further comprising a hinge with two separate axes of rotation configured to allow the secondary display to cover at least a portion of the primary display of the electronic device while the secondary display is physically coupled to the electronic device.

20. The secondary display as recited in claim 13, wherein the wireless data transmission interface is configured to transmit data between the secondary display and the electronic device by at least one of a cellular network, a Wi-Fi network, a short-range radio network, an infrared networks, or radio frequency signal.

* * * * *